(12) United States Patent
Takeuchi et al.

(10) Patent No.: US 7,127,580 B2
(45) Date of Patent: Oct. 24, 2006

(54) APPARATUS AND METHOD FOR CONTROLLING DATA ACCESS USING ENCRYPTED LINK POSITION INFORMATION

(75) Inventors: Masayuki Takeuchi, Tokyo (JP); Shinichi Kitoh, Tokyo (JP); Nobutoshi Furuya, Tokyo (JP); Takeshi Yoshino, Tokyo (JP)

(73) Assignee: Sony Corporation (JP)

( * ) Notice: Subject to any disclaimer, the term of this patent is extended or adjusted under 35 U.S.C. 154(b) by 66 days.

(21) Appl. No.: 10/416,644

(22) PCT Filed: Sep. 27, 2002

(86) PCT No.: PCT/JP02/10083

§ 371 (c)(1),
(2), (4) Date: Sep. 25, 2003

(87) PCT Pub. No.: WO03/029981

PCT Pub. Date: Apr. 10, 2003

(65) Prior Publication Data

US 2004/0059932 A1    Mar. 25, 2004

(30) Foreign Application Priority Data

Sep. 28, 2001    (JP) .............................. 2001-303328
Oct. 9, 2001    (JP) .............................. 2001-311696

(51) Int. Cl.
*G06F 12/14*    (2006.01)

(52) U.S. Cl. ...................... 711/164; 711/163; 713/202; 713/201; 709/225

(58) Field of Classification Search ..................... None
See application file for complete search history.

(56) References Cited

U.S. PATENT DOCUMENTS

| | | | | |
|---|---|---|---|---|
| 4,160,120 A | * | 7/1979 | Barnes et al. | 380/29 |
| 4,926,478 A | * | 5/1990 | Gruenberg | 705/75 |
| 5,923,756 A | * | 7/1999 | Shambroom | 713/156 |
| 5,988,510 A | * | 11/1999 | Tuttle et al. | 235/492 |
| 6,105,131 A | * | 8/2000 | Carroll | 713/155 |
| 6,496,802 B1 | * | 12/2002 | van Zoest et al. | 705/14 |
| 6,671,358 B1 | * | 12/2003 | Seidman et al. | 379/93.12 |
| 6,766,305 B1 | * | 7/2004 | Fucarile et al. | 705/51 |
| 6,772,332 B1 | * | 8/2004 | Boebert et al. | 713/153 |
| 6,931,532 B1 | * | 8/2005 | Davis et al. | 713/167 |

FOREIGN PATENT DOCUMENTS

| | | |
|---|---|---|
| JP | 11/096098 | 4/1999 |
| JP | 2001-014235 | 1/2001 |

* cited by examiner

*Primary Examiner*—B. James Peikari
(74) *Attorney, Agent, or Firm*—Lerner, David, Littenberg, Krumholz & Mentlik, LLP

(57) ABSTRACT

An access restriction apparatus, an access restriction method, a computer readable program storage medium having a recorded access restriction program, and the access restriction program, all capable of making a terminal refer only to management information existing at a position designated by link position information. An access restriction apparatus for limiting the access of terminals desiring access to managed management information is provided with a supply section for supplying the terminals with partially or totally encrypted link position information indicating a linking destination of the management information, and an access management section for managing the access of the terminals to the management information based on the link position information decoded by the terminals.

10 Claims, 19 Drawing Sheets

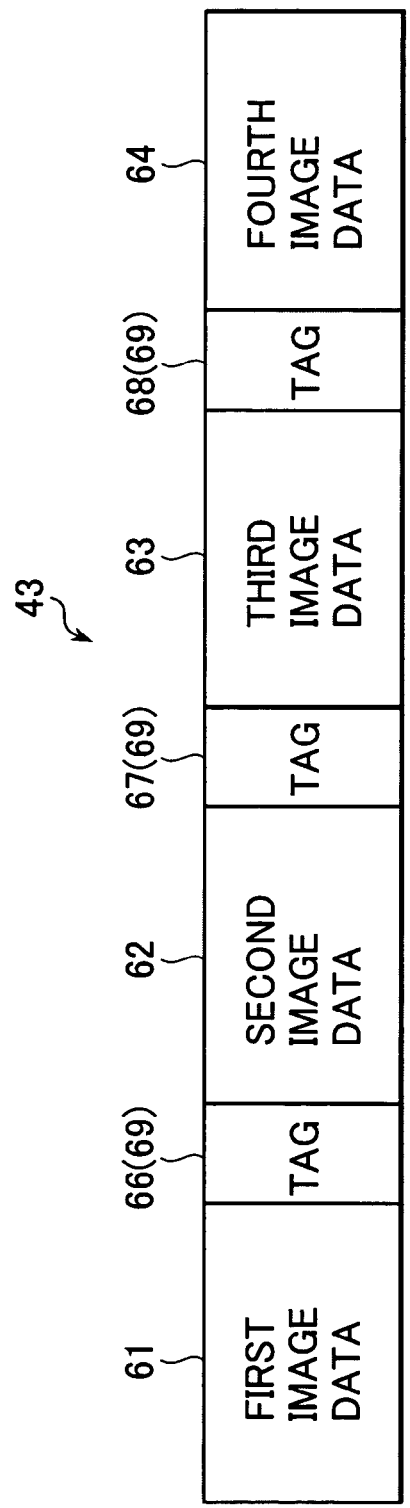
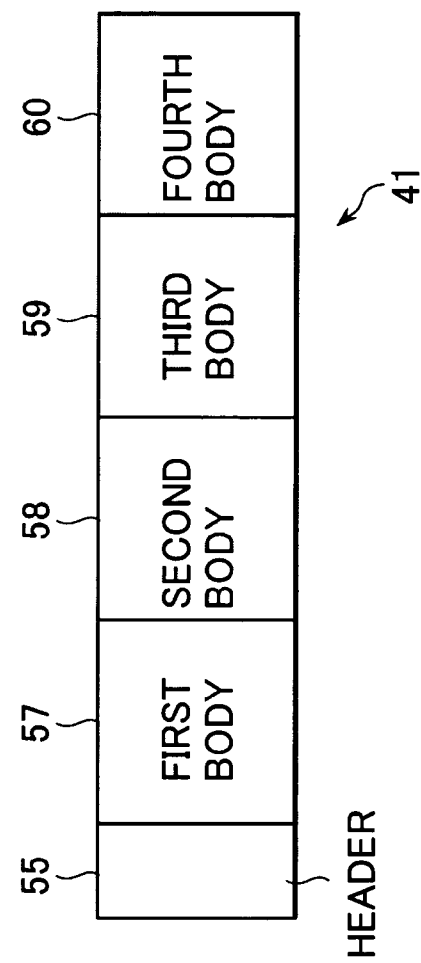

FIG.12

```
INDEX:=IDX_HEAD{IDX_BODY}(*)
IDX_HEAD:=VERSION(DI(1))
    DTAG_OFF (DI(1)) DTAG_COUNT (DI(1))
    DABS_OFF (DI(1)) DABS_LEN (DI(1))
    RESV1(DI(1)) RESV2(DI(1)) RESV3(DI(1)) RESV4(DI(1))

IDX_BODY:=DEG(DI(1))
    ACT_WIDTH(DI(1)) ACT_HEIGHT(DI(1)) ACT_DPI(DI(1))
    ACT_CMP(DI(1)) ACT_OFF(DI(1)) ACT_LEN(DI(1))
    THUMB_WIDTH(DI(1)) THUMB_HEIGHT(DI(1)) THUMB_CMP(DI(1))
    THUMB_OFF(DI(1)) THUMB_LEN(DI(1))
    TAG_OFF(DI(1)) TAG_NUM(DI(1))
    ANN_OFF(DI(1)) ANN_NUM(DI(1))
    ABS_OFF(DI(1)) ABS_LEN(DI(1))
    ABS_REGD(DI(1)) RESV1(DI(1)) RESV2(DI(1)) RESV3(DI(1))
```

41

55

57

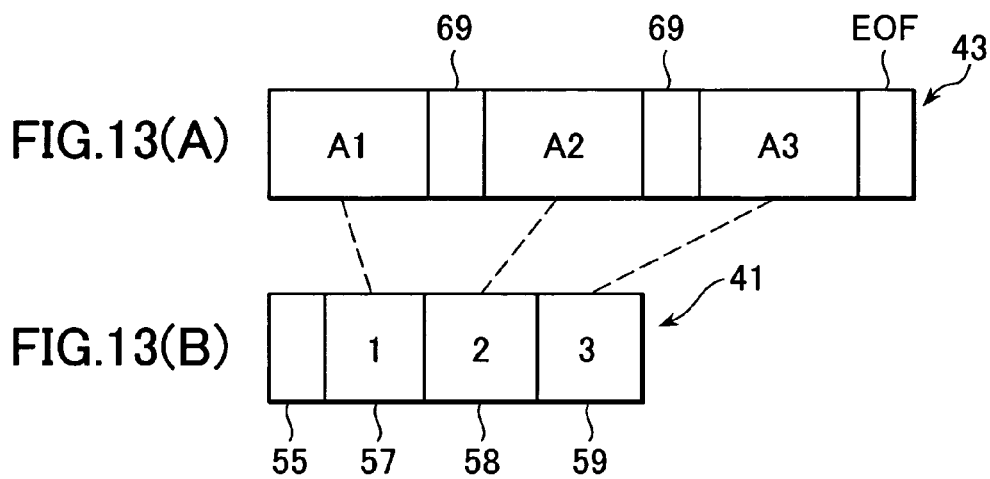
FIG.13(A)
FIG.13(B)
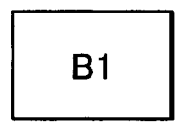
FIG.14
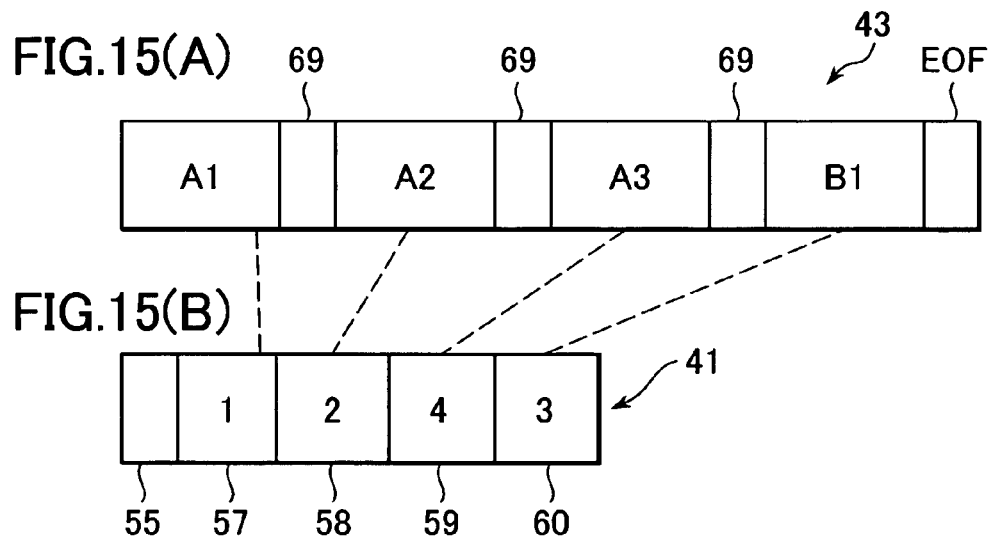
FIG.15(A)
FIG.15(B)

FIG.16(A)

INDEX = A
HEAD = A
BODY = A1 A2 A3
INDEX = B
HEAD = B
BODY = B1

FIG.16(B)

INDEX = C (A + B)
HEAD = C (A + B)
BODY = A1 A2 B1 A3

FIG.19(A)

INDEX = A
HEAD = A
BODY = A1 (57), A2 (58), B1 (59), A3 (60)

INDEX = A
HEAD = A
BODY = A1 (57), A2 (58), A3 (59), X (60)

41

FIG.20(A)
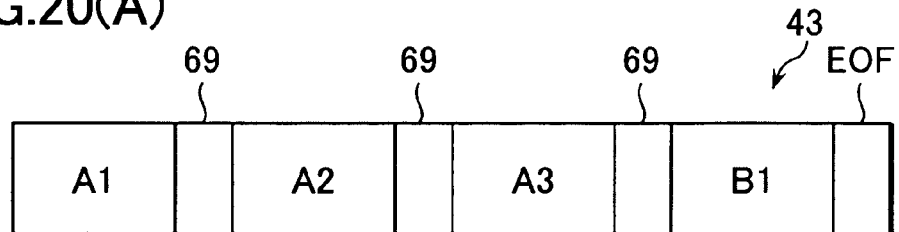
FIG.20(B)
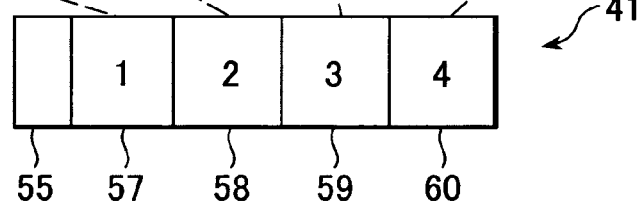
FIG.21(A)
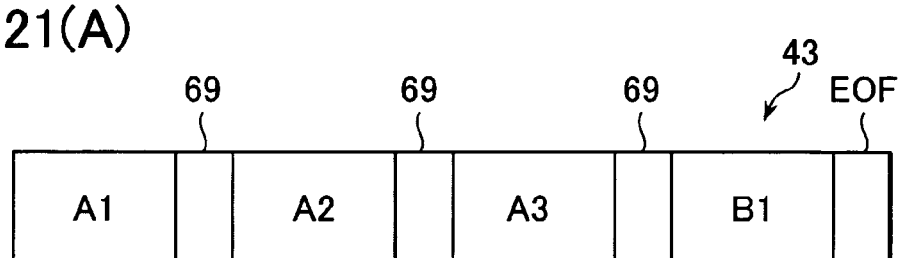
FIG.21(B)
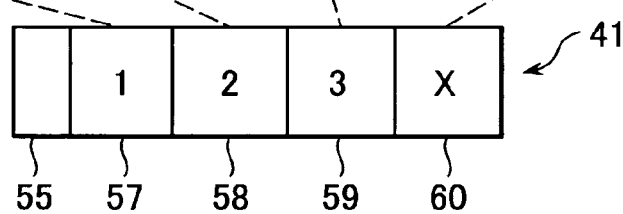
FIG.22(A)
FIG.22(B)
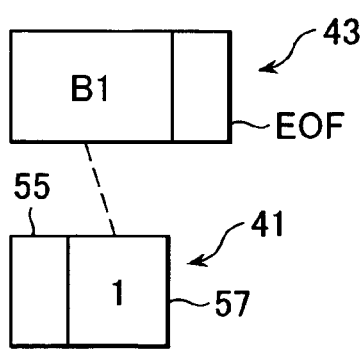

FIG.24
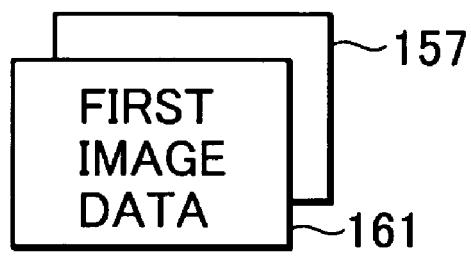
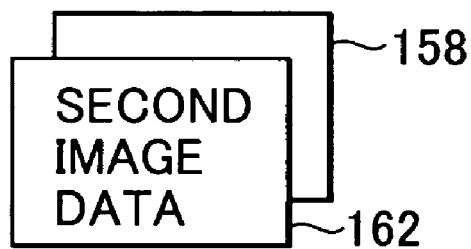
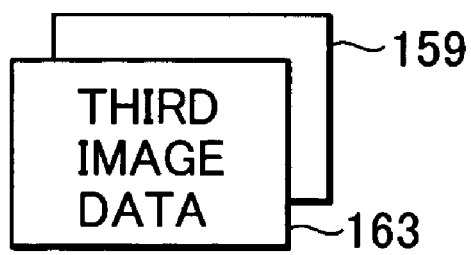
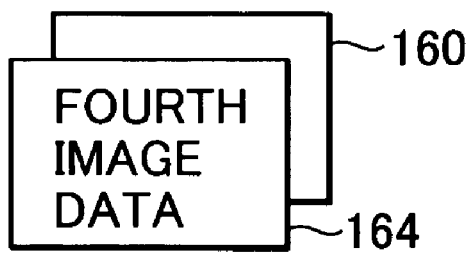

APPARATUS AND METHOD FOR CONTROLLING DATA ACCESS USING ENCRYPTED LINK POSITION INFORMATION

TECHNICAL FIELD

The present invention relates to an access restriction apparatus, an access restriction method, a computer readable program storage medium in which an access restriction program is recorded, and an access restriction program.

BACKGROUND ART

Recently, image data such as, for example, an image photographed with a digital camera or an image read with an optical character reader (OCR) is being exchanged through a network, such as the Internet. A cellular telephone equipped with a digital camera is available, and it is now possible to exchange image data between cellular telephones. Conventionally, an aggregate of binary data, such as image data, is managed as a file including information relating to the image, for example, information relating to image resolution.

For example, as shown in FIG. 24, conventionally first image data 161 and the information 157 relating to the image data 161 have been managed as one file; second image data 162 and the information 158 relating to the image data 162 have been managed as one file; third image data 163 and the information 159 relating to the image data 163 have been managed as one file; and fourth image data 164 and the information 160 relating to the image data 164 have been managed as one file.

If a plurality of binary data is to be copied or deleted, it has been necessary to process each binary data file individually, except for performing a process on the folder or on the directory. So, if a plurality of binary data is processed by batch processing, the batch processing may not always be completed due to an omission in the processing of a part of the binary data. Because binary data, such as image data, cannot include character information, the file name associated with the binary data is keys to retrieving such binary data, their creation dates and their update dates. Therefore, it is difficult for the user to handle such binary data.

Further, owing to the recent advancement of the information industry, data communications of document information including the binary data described above are frequently performed though networks, such as the Internet. For example, on the Internet, browser software is configured to read data described by means of a mark up language called Hyper Text Markup Language (HTML) for displaying the description of the data.

The markup language can describe a site that is desired to be linked to and the markup language is adapted to make it possible for the browser software to access link position information, such as a Uniform Resource Locator (URL), as the link destination. In the following description, "URLs" will be exemplified. In the conventional file linking by means of the HTML markup language, the linking functions to change a display corresponding to a change of URLs by changing one URL to another URL designating a position of a document. This is described in Japanese Patent Laid-open Publication Hei 11-96098 at page 5, section 0012.

Since the URL is described, however, by means of text data which is easily understood visually, the URL may easily be altered. Consequently, files other than the file designated by an original URL may easily be accessed.

More specifically, suppose a URL such as "http://www.aaa.ne.3p/20010101.html" was originally designated, the above-mentioned problem occurs at the time of amending the URL to another estimated URL such as "http://www.aaa.ne.jp/20010102.html," which is intended to refer to the next file.

That is, there is a problem in that a person having an evil intention can access the file ("http://www.aaa.ne.jp/20010102.html") other than the original file ("http://www.aaa.ne.jp/20010101.html").

Conventionally, it was impossible to prohibit tracing a URL other than the originally designated URL. If the prohibition was attempted, it was necessary to perform complicated processing, such as alteration of the file designated by the URL, in advance.

Moreover, if a URL to be kept secret is transferred by electronic mail, there is a problem in that anyone who receives the URL can easily access a file at a URL other than the transferred URL.

Accordingly, the present invention aims to provide an access restriction apparatus, an access restriction method, a computer readable program storage medium having a recorded access restriction program, and the access restriction program, capable of solving the problems described above and of allowing a terminal to refer only to management information that exists at a position designated by link position information.

SUMMARY OF THE INVENTION

According to the present invention, there are provided an access restriction apparatus, an access restriction method, a computer readable program storage medium having a recorded access restriction program, and the access restriction program, capable of allowing a terminal to refer only to management information that exists at a position designated by link position information.

BRIEF DESCRIPTION OF THE DRAWINGS

FIG. 11A is a diagram of a data configuration of the actual file in FIG. 10, and FIG. 11B is a diagram of a data configuration of the index file in FIG. 10.

FIG. 12 is a showing of the data format of the index file of FIG. 11.

FIGS. 13A and 13B are diagrams of the processing used when adding image data.

FIG. 14 is a diagram showing the added image data.

FIGS. 15A and 15B are diagrams showing the processing used when adding the image data.

FIG. 16A is a diagram showing a configuration of the index file before the addition processing, and FIG. 16B is a diagram showing a configuration of the index file after the addition processing.

FIG. 19A is a diagram showing a configuration of the index file before the deletion processing, and FIG. 19B is a diagram showing a configuration of the index file after the deletion processing.

FIGS. 20A and 20B are diagrams showing the process of dividing image data.

FIGS. 21A and 21B are diagrams showing the process of dividing image data.

FIGS. 22A and 22B are diagrams showing the process of dividing image data.

FIG. 24 is a diagram showing a conventional access restriction method.

BEST MODES FOR CARRYING OUT THE INVENTION

Hereinafter, preferred embodiments of the present invention will be described in detail based on the drawings.

Since the embodiments to be described in the following are a suitable concrete examples, various technically preferable limitations can be added to it. The scope of the present invention, however, is not limited to the forms of the limitations as long as a description indicating that the present invention is especially limited to the forms is not made.

First Embodiment

Figure 1:
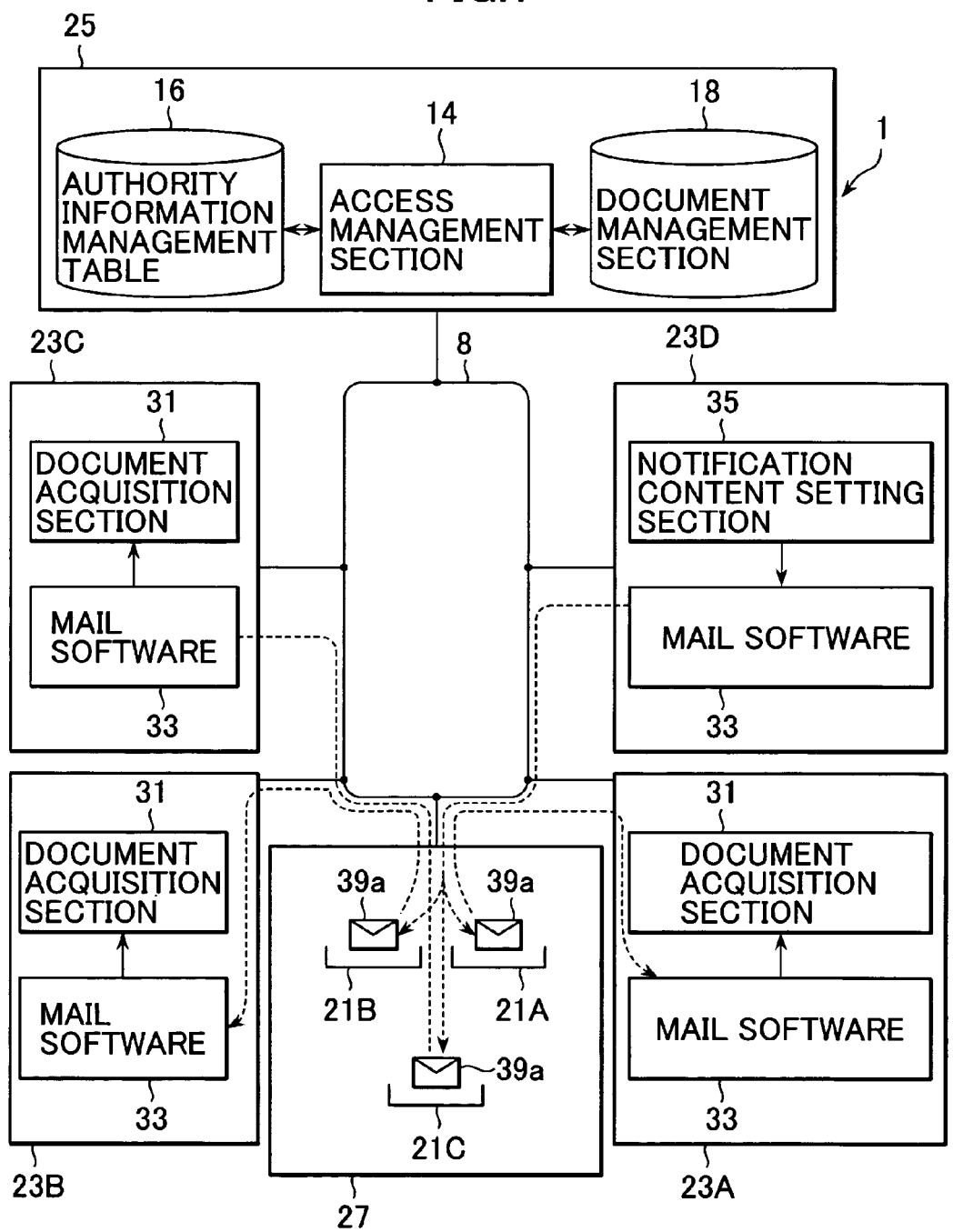
FIG. 1 is a system block diagram of a data management system to which a data management apparatus is applied as a preferable embodiment of the present invention.

FIG. 1 is a system block diagram showing a configuration of a data management system 1 to which a data management apparatus as a preferable embodiment of the present invention is applied.

The data management system 1 is provided with a document management server computer 25, client computers 23A, 23B, 23C and 23D as terminals, a network 8 and a mail server computer 27. In the following descriptions, persons operating the client computers 23A, 23B, 23C and 23D will be called, "Mr. A", "Mr. B", "Mr. C" and "Mr. D", respectively. Collectively, they will be referred to as "accessing persons".

The management server 25 is provided with an authority information management table 16, an access management section 14 and a document management section 18.

Figure 2:
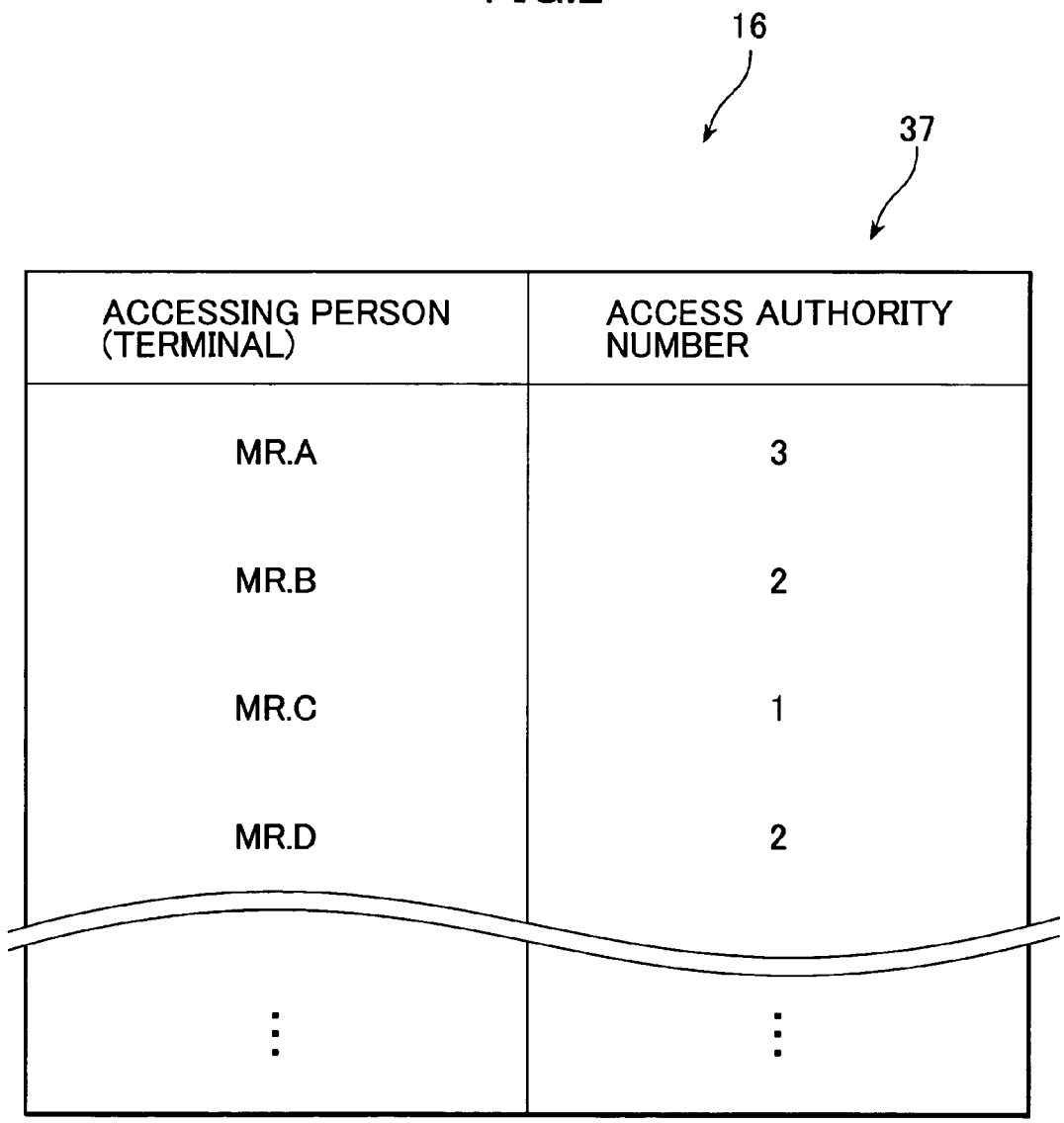
FIG. 2 shows the authority information management table of FIG. 1.

The authority information management table 16 is a table for managing the access authority of the client computers 23A–23Ds which the accessing persons operate. The authority information management table 16 manages the access authority to the access persons, for example, as shown in FIG. 2. As shown in FIG. 2, Mr. A has the access authority of "3", Mr. B has the access authority of "2", and Mr. C has the access authority of "1".

Figure 3:
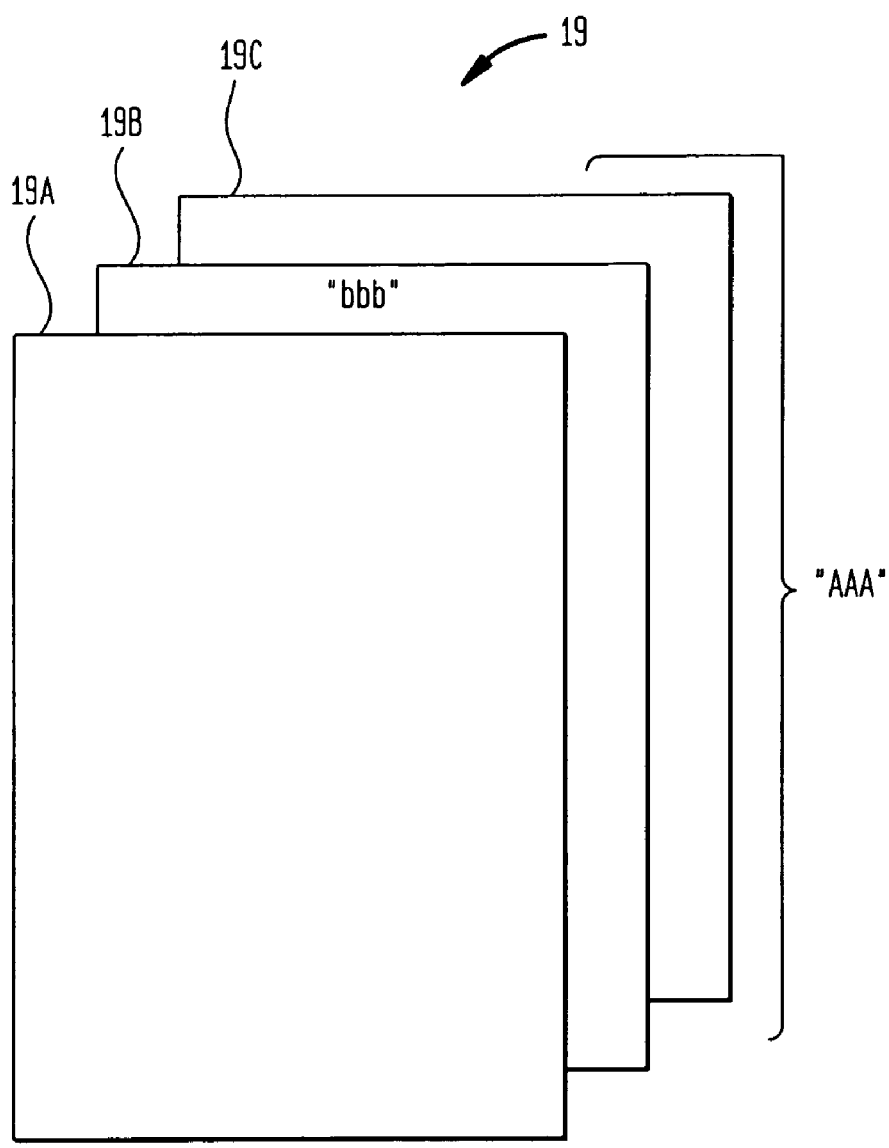
FIG. 3 shows the document group managed by the document management section of FIG. 1.

The document management section 18 manages documents to be stored as shown in FIG. 3 as a document group 19. The document group 19 is managed under a classification in which the document group 19 is classified into documents 19A, 19B and 19C as management information. It is assumed in this example that the document group 19 has a document group name "AAA", and that the document 19B has a document name "bbb".

Figure 4:
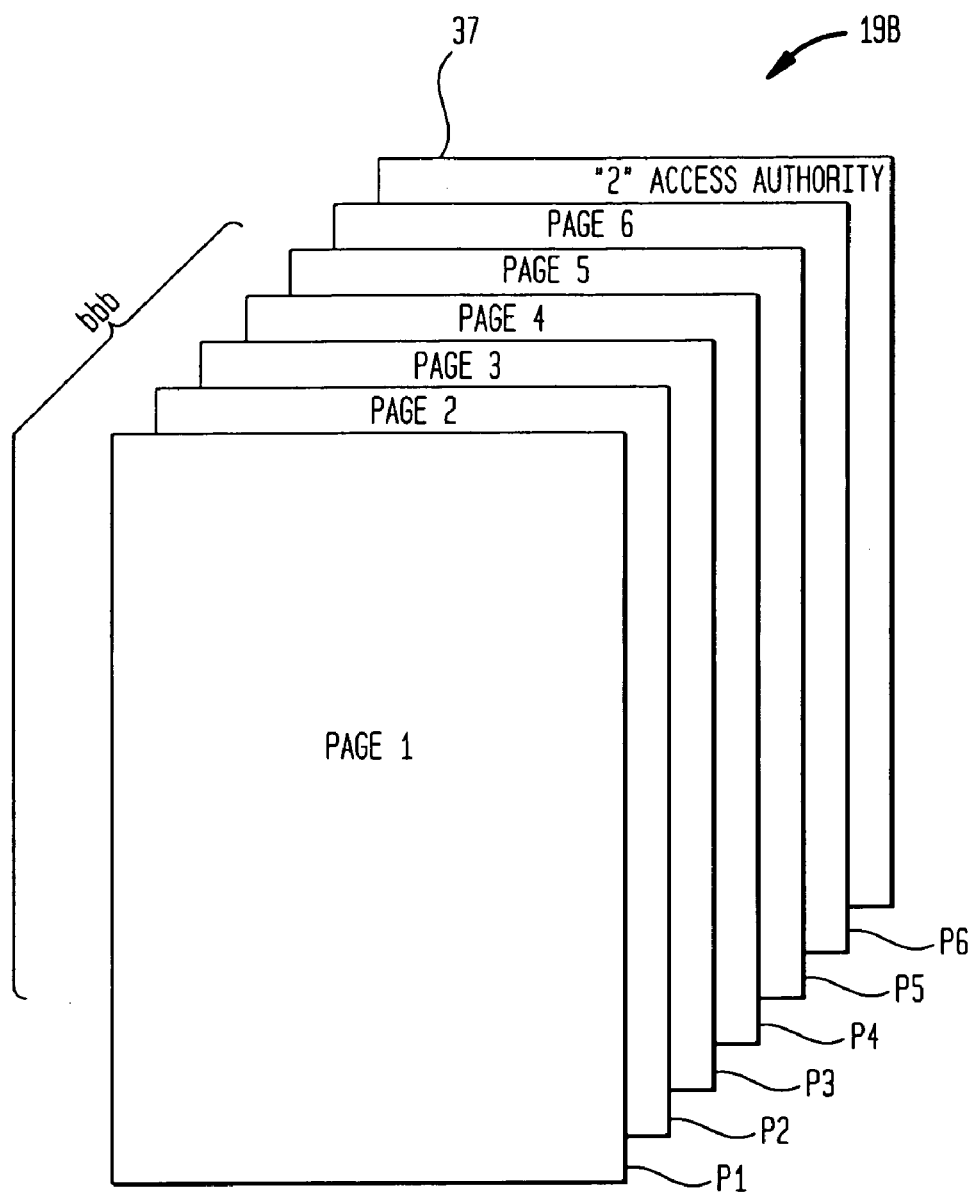
FIG. 4 shows a configuration of the document of FIG. 3.

Moreover, the document 19B has documents composed of pages, for example, from a first page PI to a sixth page P6 comprising a plurality of pieces of unit information, as shown in FIG. 4, and authority information 37 is attached to them. The authority information 37 is the access authority set in the authority information management table 16 shown in FIG. 2, and the authority information 37 is, for example, "2".

The access management section 14 of FIG. 1 acquires the access authority from the authority information management table 16 to every accessed client, such as client 23A and so on. The access management section 14 is configured to supply the client 23A and others with a document composed of set pages such as the document 19A of FIG. 3 and so on when the access management section 14 judges that the client 23A and others have the access authority.

Figure 5:
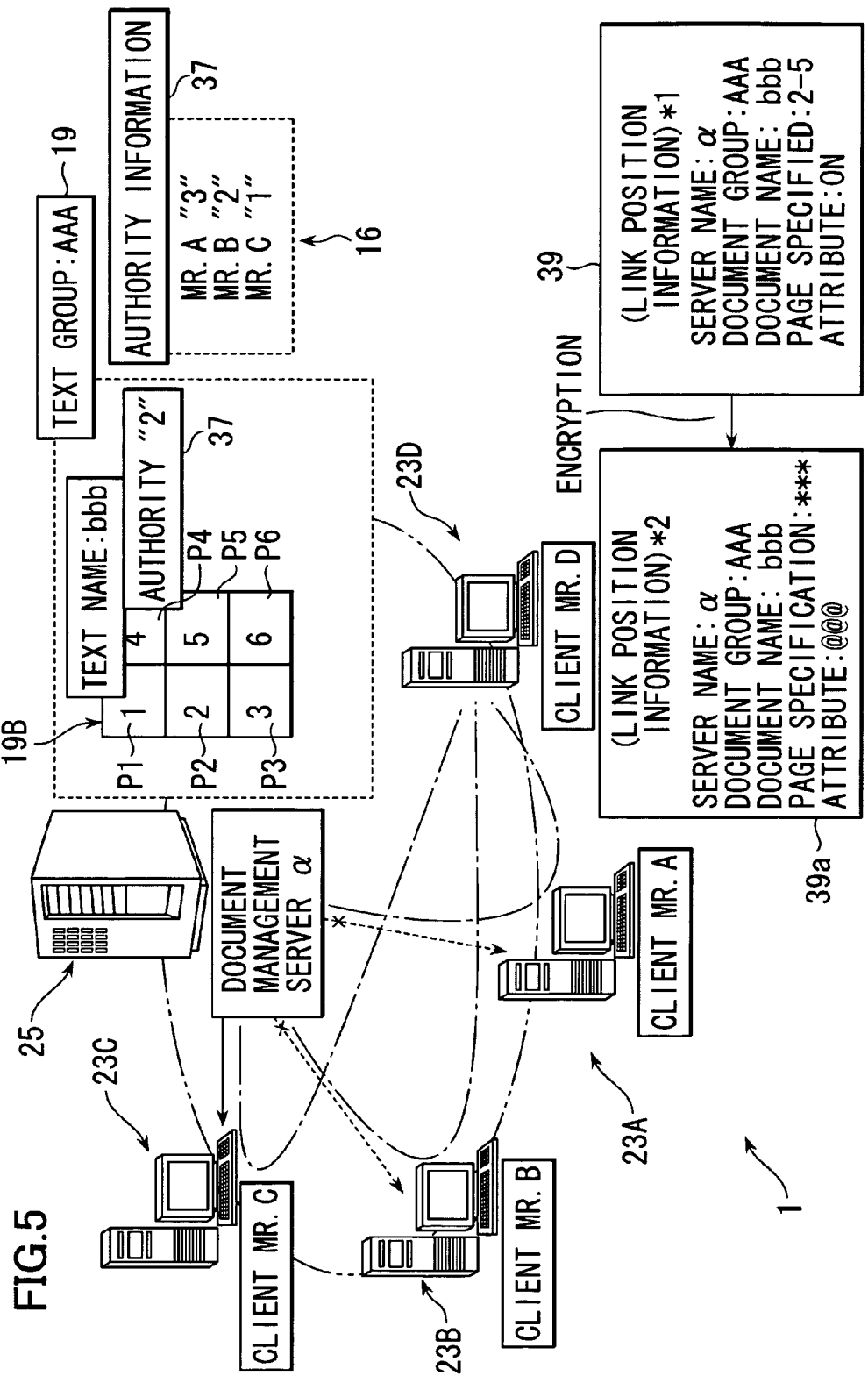
FIG. 5 is a system for performing a data management method by a management server.

On the other hand, the client 23D in FIG. 1 includes a notification content setting section 35 and mail software 33. The notification content setting section 35 has the function of setting link position information 39 shown in FIG. 5 including the information indicating a linking destination such as the document 19A and so on as the contents intended to be notified to the client 23A. More specifically, in the link position information 39, "a" as a server name, "AAA" as a document group, "bbb" as a document name, "pages 2–5" as page specification, and "ON" as an attribute are set, as shown in FIG. 5. The link position information 39 may be adapted to encrypt not only the information indicating the linking destination, but also any one of or a combination of some of the page specification, access authority, and the attribute.

The mail software 33 shown in FIG. 1 is software having the function of exchanging electronic mail with the other clients 23A–23D by utilizing mail boxes 21A–21C of the mail server 27. The mail software 33 can receive the documents 19A–19C composed of the pages corresponding to access authority from the management server 25 as will be described later. It is needless to say that the means of data communication is not limited to mail software, but other means may be used as well.

The client 23A includes a document acquisition section 31 and mail software 33. Since the mail software 33 has functions similar to those of the above-mentioned mail software 33 of the client 23D, the description thereof is omitted. The document acquisition section 31 can acquire the documents 19A–19C composed of predetermined pages received by the mail software 33 to display the documents 19A–19C. Since the clients 23B and 23C have configurations and functions similar to those of the client 23A, the descriptions thereof are omitted here.

The management server 25 has the configuration described above. Next, FIGS. 1–4 are referred to while an example of the data management method of the management server 25 is described.

Figure 6:
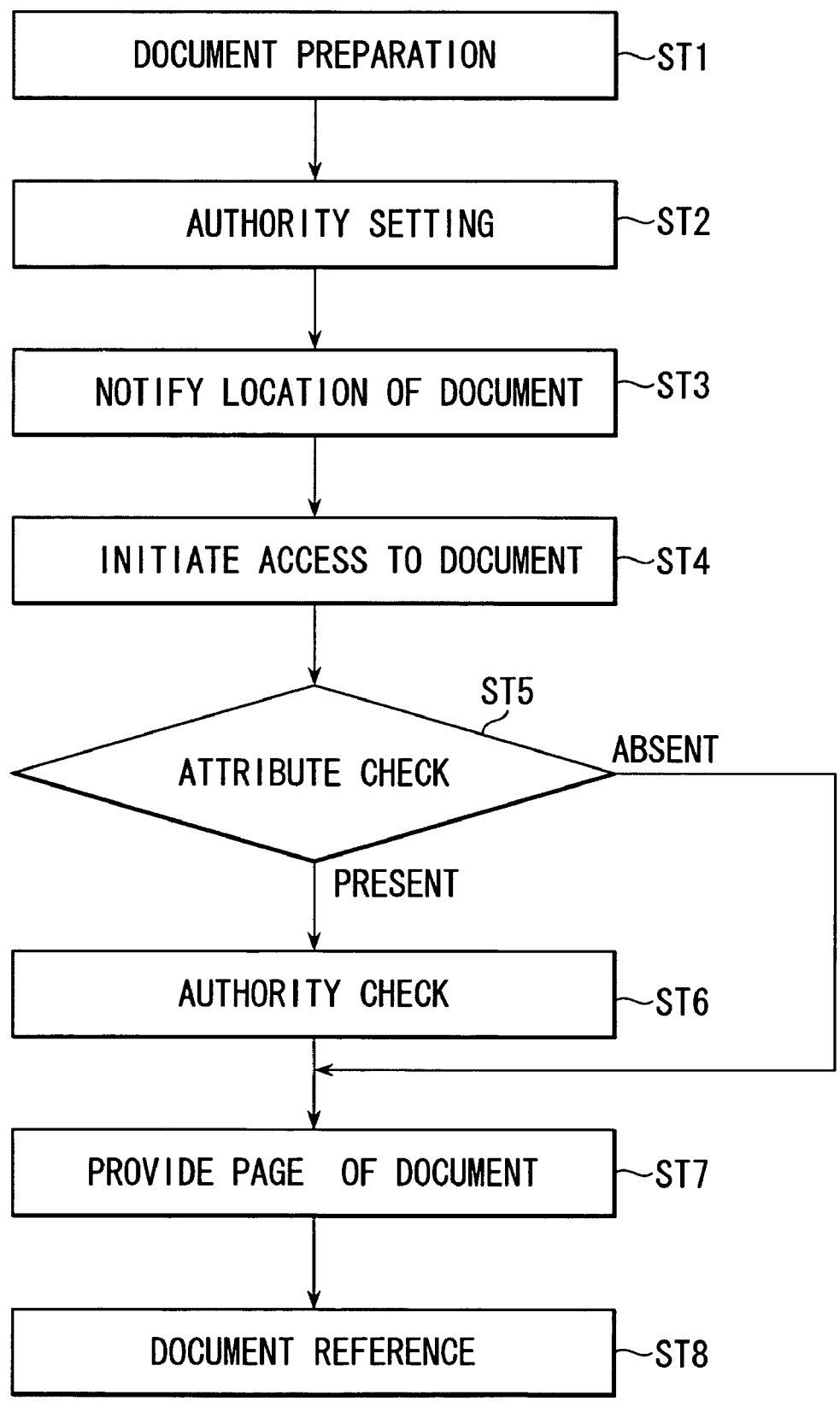
FIG. 6 is a flow chart showing the data management method performed by the management server.

FIG. 5 is a view showing the data management method of the management server 25 conceptually. FIG. 6 is a flow chart showing of the data management method of the management server 25. In the following descriptions, the client 23A is called as "Mr. A"; the client 23B is called as "Mr. B"; the client 23C is called as "Mr. C"; and the client 23D is called as "Mr. D".

As shown in FIG. 5, it is assumed that the document 19B composed of six pages from the first page P1 to the sixth page P6 shown in FIG. 4 is prepared in the document group 19 as "document group AAA" shown in FIG. 3 together with the access authority "2" on the management server 25 having the name "a" as in Step ST1 of FIG. 6.

Moreover, it is assumed that the pieces of access authority "3", "2" and "1" are given to Messrs. A, B and C, respectively, as the access authority, as shown in FIG. 2 and comprising Step ST2 of FIG. 6.

Now, Mr. D is going to notify Messrs. A, B and C of the locations of the data of the pages of the document 19B having the document name "bbb" from the second page P2 to the fifth page P5 which are public pages shown in FIG. 4 for showing the pages to Messrs. A, B and C.

Mr. D inputs pieces of position information for example from the server name to the document name concerning the location of the document 19B by means of the notification content setting section 35 as shown in FIG. 5. Thereby, Mr. D performs page setting as described above, and sets the attribute "ON". Hereupon, the attribute indicates that only receivers, such as Mr. A and the like having the access authority, for example, smaller than a certain number of access authority can browse the document 19B after the confirmation of the existence of the authority of the receivers at the time of setting "ON". Thus, the receivers can browse the document 19B regardless of their access authority without the confirmation of the existence of the authority at the time of setting "OFF".

At the time of the performance of these settings, it is preferable that Mr. D has the authority for referring to at least the document 19B having the document name "bbb". As the setting methods of the authority, for example, direct inputting by hand may be adopted, or designation in conformity with the gist of copying and pasting at the time of editing may be adopted.

After the completion of the setting of the link position information 39 as such notification information, Mr. D encrypts the page specification and the attribute in the link position information 39, as shown in FIG. 5 by means of the notification content setting section 35. Then, the encrypted link position information 39*a* is distributed by being transmitted by electronic mail to the mail boxes 21A–21C of the mail server 27 by means of the mail software 33 to be notified to Mr. A and so on comprising Step ST3 of FIG. 6.

Mr. A and Mr. D operate the client 23A–23D respectively, to refer to the electronic mail pertaining to the link position information 39*a*, and initiate access to the management server 25 comprising Step ST4 of FIG. 6. Accessing the management server 25 first initiates the checking of the attribute comprising Step ST5 of FIG. 6. As described above, the authority is set so that Mr. A has the access authority "3", Mr. B has the access authority "2", and Mr. C has the access authority "1" for example.

Although the link position information 39*a* is automatically encrypted in the memories of the client A and so on, the access authority of Mr. A and so on is "3", which is larger than the above-mentioned "2". Consequently, Mr. A and Mr. D so on do not have the access authority, and cannot browse the encrypted link position information 39.

Hereupon, since the attribute is "ON" in the link position information, the clients 23A and so on severally confirm the access authority necessary for referring to the document 19B having the document name "bbb" in the management server 25, and know that, in this example, access authority "2" is necessary.

Since Messrs. A and B have the authority number larger than the authority "2", Messrs. A and B do not have the access authority to the pages from the second page P2 to the fifth page P5 of the document 19B. On the contrary, since Mr. C has the authority number "1", it is known that Mr. C has the access authority for referring to the pages comprising Step ST6 of FIG. 6. As described above, when the attribute of the link position information 39 is "OFF", the confirmation of the access authority to the management server 25 is not performed, and Messrs A and B having no proper access authority also can refer to the pages of the document 19B having the document name "bbb" from the second page P2 to the fifth page P5.

The transmission of the link position information 30*a* concerning the document 19B having the document name "bbb" from Mr. D to Mr. C is notified to Mr. C comprising Step ST7 of FIG. 6. When Mr. C accesses the management server 25 by means of the contents of the link position information 39*a* as a key, Mr. C can browse only the pages of the document 19B from the second page P2 to the fifth page P5. That is, the management server 25 is configured so that Mr. C cannot browse the pages other than the browsable pages such as the first page P1 and the sixth page P6. Consequently, the management server 25 is configured to be able to make the document 19B intended to be browsed secret or browsable at every page.

In this case, it is preferable that the actual page numbers indicating the first page P1 and the sixth page P6 severally cannot be browsed. This makes it impossible for Mr. A and so on, who browsed the browsable pages, to recognize the existence of the non-browsable pages, such as the first page P1.

In this situation, Messrs. A and B cannot refer to the document name "bbb" as long as their access authority is made to be "2" or more, or as long as the link position information 39*a* in which the attribute "OFF" is encrypted is transmitted to them. Consequently, it is possible to make the respective clients 23A and 23B of Messrs. A and B, which have no access authority, impossible to browse the document 19B of the management server 25. Hence, secrets can be kept.

According to the first embodiment of the present invention, it is possible that the client 23C can access only the partial pages of the document 19B which the client 23C is allowed to access. Moreover, even if the access authority to the document 19B is not changed, it is possible to make a specific person refer to the information of the document 19B by setting the attribute of the link position information 39 to "OFF". Moreover, in the embodiment described above, the input and the output of the file of the pages of the document 19B, for example, from the second page P2 to the fifth page P5 are limited to be fixed.

Moreover, since the link position information 39*a* is encrypted, it is difficult to alter the link position information 39*a* including the linking destination. If the alteration of the link position information 39*a* is performed, the decoding of the information 39*a* becomes impossible, thus making it impossible to use the data. Moreover, if the document 19B at the linking destination is transferred without previous notice, the terminal having no access authority to which the document 19B has been transferred cannot browse the document 19B, since the access authority is individually set for every client.

Second Embodiment

Figure 7:
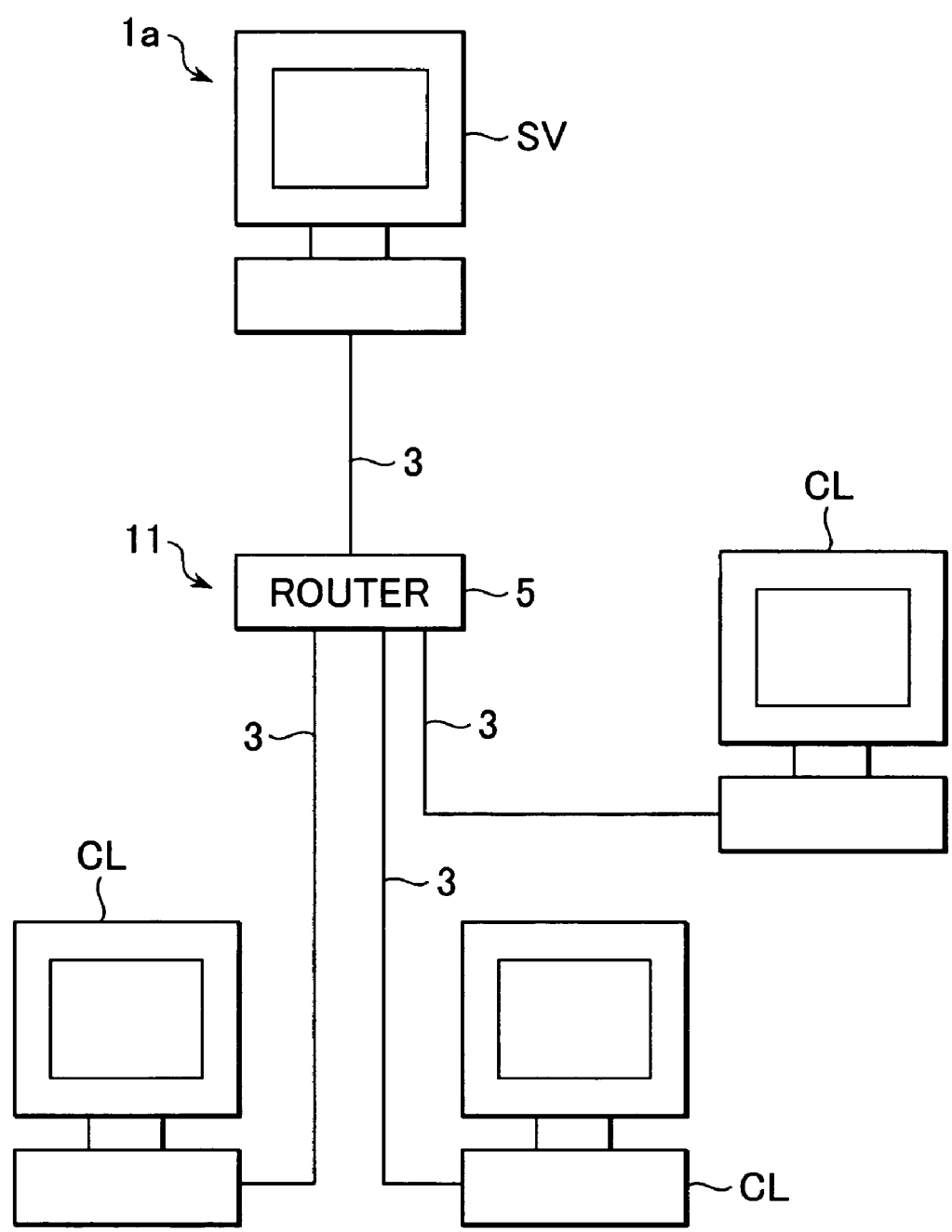
FIG. 7 is a system configuration diagram of a data management system including a server computer to which an access restriction apparatus is applied as a second embodiment of the present invention.

FIG. 7 is a data management system 1a including a server computer SV to which an access restriction apparatus is applied according to a second embodiment of the present invention.

The data management system 1a includes the server computer SV, a network 11 and client computers CL, and is a computer system employing the so-called client server system.

The server computer SV is capable of processing predetermined processes at a high speed in response to a demand of a client computer CL. For example, predetermined basic software is operated on the server computer SV. The client computers CL, for example, demand predetermined processes from the sever computer SV. Predetermined basic software is operated on the client computers CL. The basic software is also called an operating system (OS) which has the function of data communication by use of a protocol, such as Transmission Control Protocol/Internet Protocol (TCP/IP) or the like, on the network 11 and can carry out an access restriction program that will be described later. The access restriction program may have a function substantially same as the basic software, so that the program performs without the basic software.

The data management system 1a is characterized in that management information corresponding to the document 19A of the first embodiment and the like is managed in the following way instead of performing functions of the data management system 1 of the first embodiment. That is, the data management system 1a performs management processing on a data aggregate that is integrated by combining a plurality of data while having delimiter information between those plurality of data. The plurality of data constitute management information, and related information in the aggregate that is integrated by combining a plurality of related information, each of which respectively relates to the plurality of data.

The network 11 includes a router 5 and cables 3. The network 11 has the function of data communication between the server computer SV and the client computers CL through network cards or the like provided at the server computer SV and the client computers CL. The cables 3 are for the 10-BASE-T or for 100-BASE-T protocols, for example. The router 5 has the function of performing data exchange while controlling the data passing through the cables 3.

Figure 8:
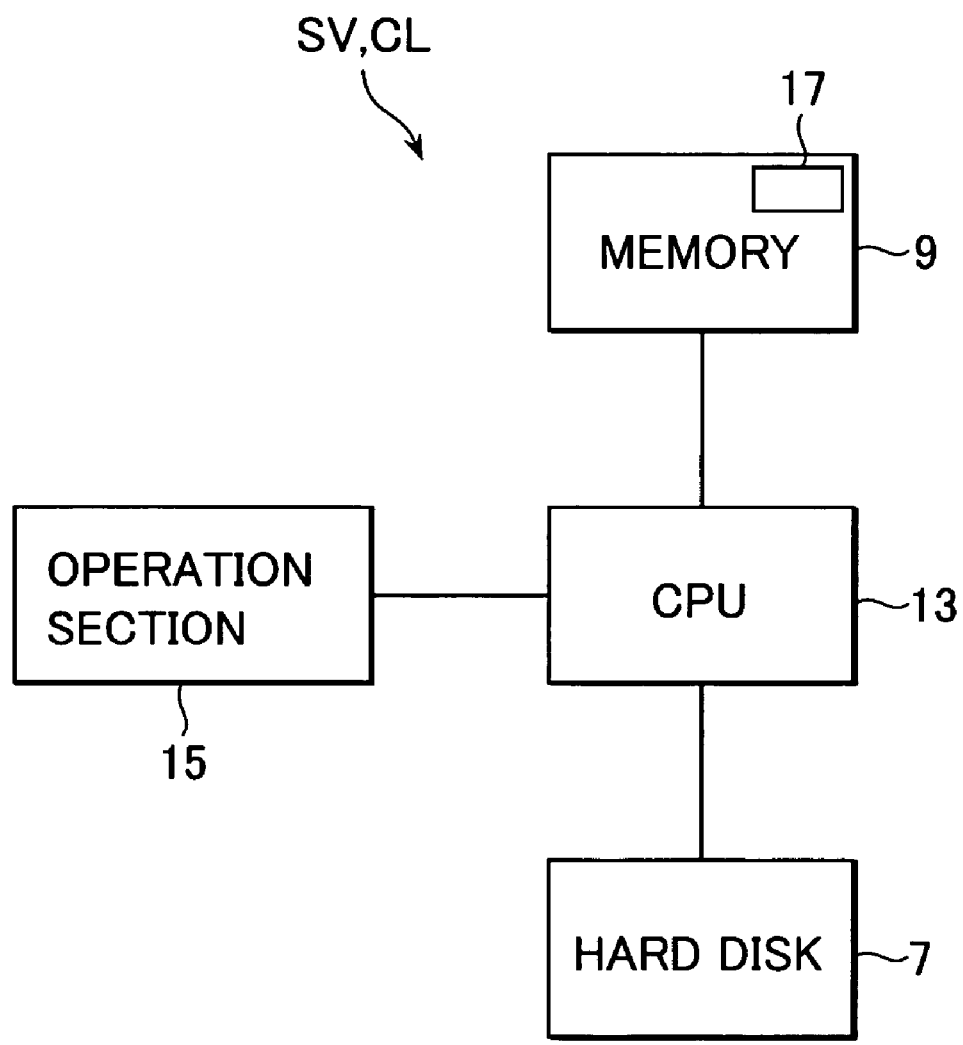
FIG. 8 is a block diagram nof the server computer of FIG. 7.

FIG. 8 is a block diagram showing a simple configuration of the server computer SV of FIG. 7. The server computer SV includes an operation section 15, a central processing unit 13, a memory 9, and a hard disk 7.

The operation section 15 is a user operation unit such as a keyboard or a mouse. The hard disk 7 is a large capacity information recording medium capable of recording various kinds of data and programs.

The memory 9 is a volatile information recording medium capable of temporarily storing various kinds of data, basic software, and a program. The CPU 13 can recognize operations of the operation section 15 and can execute a predetermined process, also the CPU 13 can read an access restriction program 17 stored in the hard disk 7, and write into a work area of the memory 9 for executing the access restriction program 17. Descriptions of the operation of the client computers CL are omitted because the server computer SV has the substantially the same configuration as the client computers CL except that the processing of the CPU 13 operates at a higher speed than the client computers CL.

Figure 9:
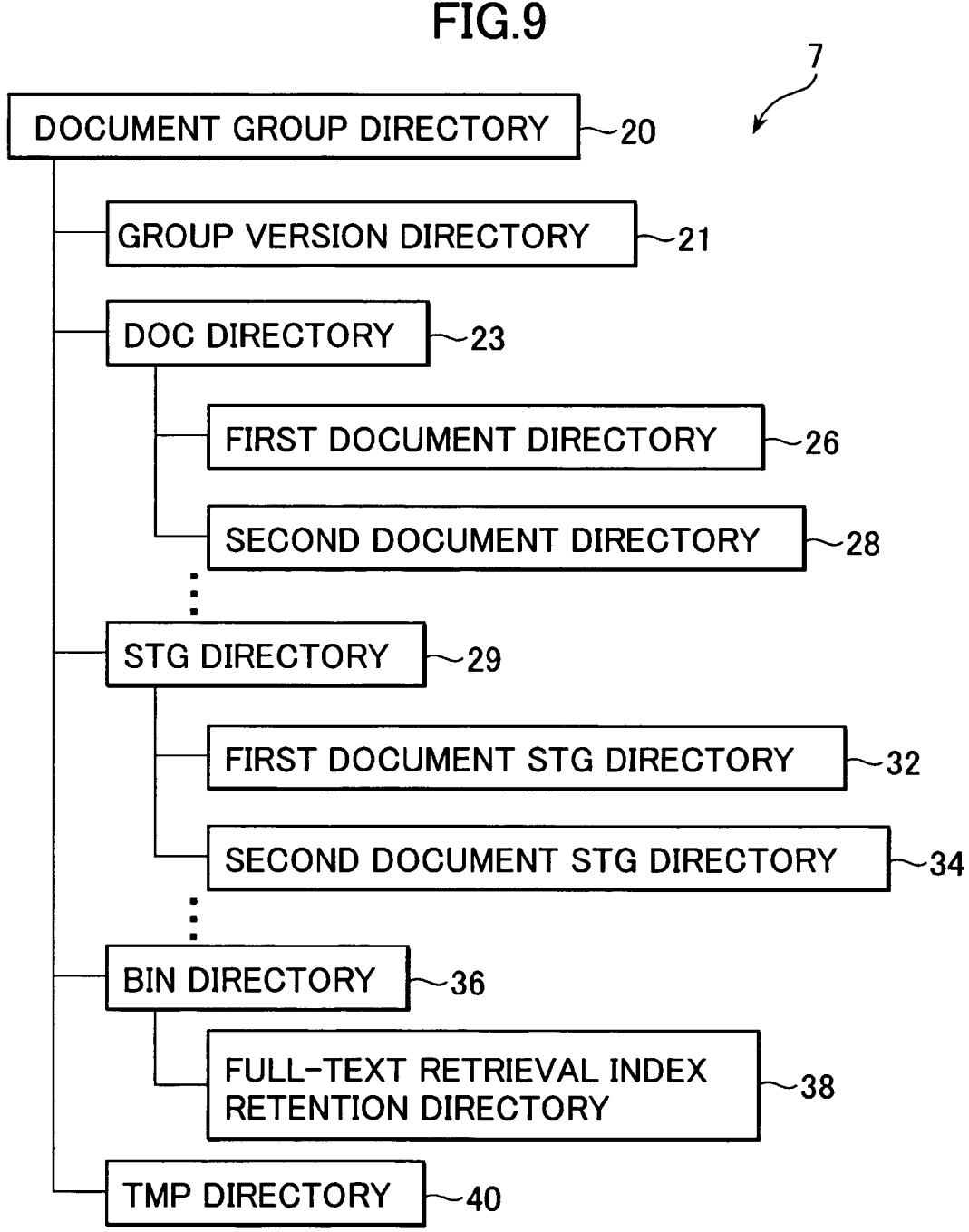
FIG. 9 is a diagram of a directory structure for the management of data by an access restriction program in the system of FIG. 8.
Figure 10:
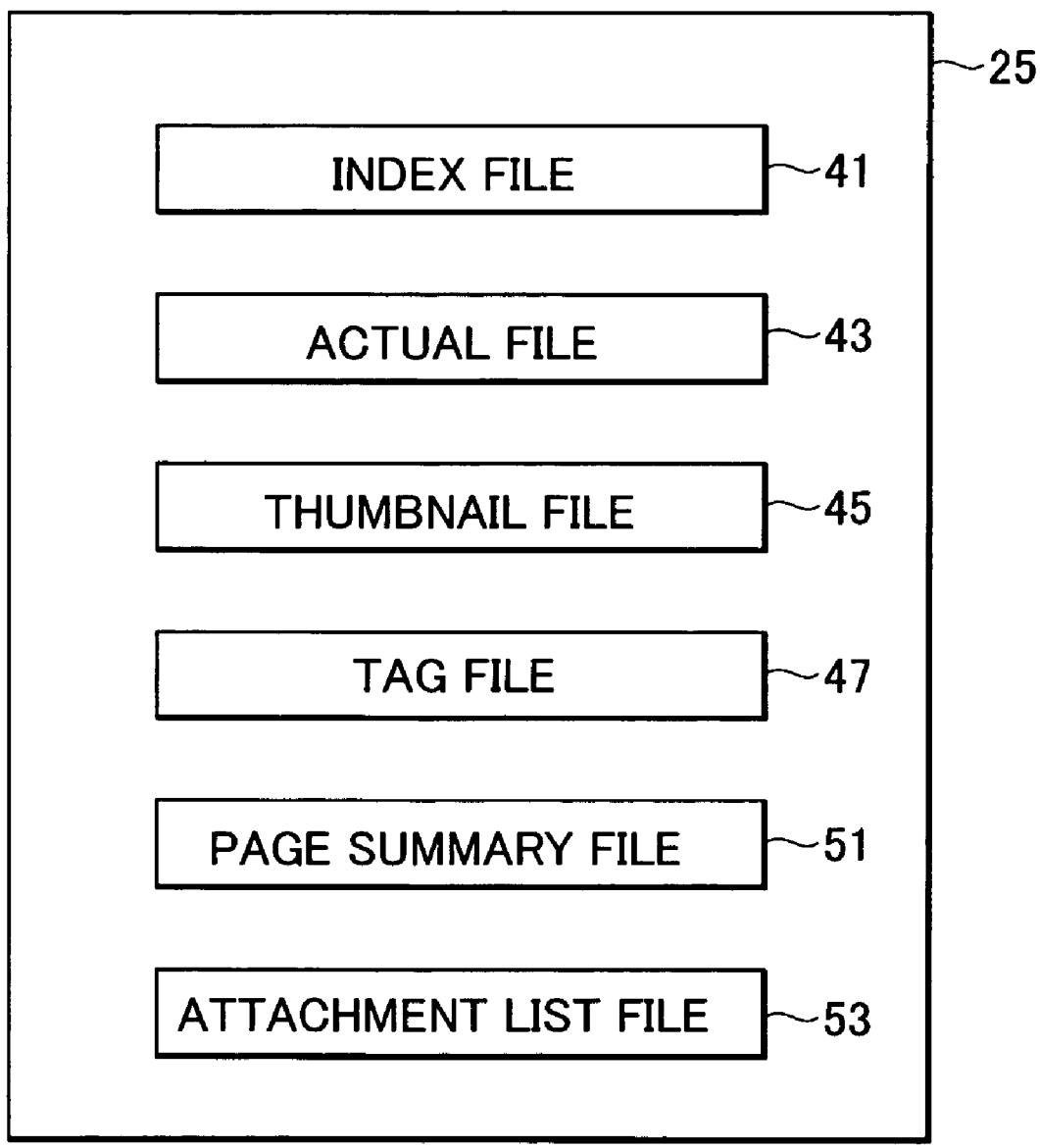
FIG. 10 is a diagram of data stored in a first document directory of FIG. 9.

FIG. 9 is a diagram of a directory structure for the management of data by the access restriction program 17 of FIG. 8. FIG. 10 is a diagram showing the structure of data stored in a first document directory 25 of FIG. 9.

The access restriction program 17 of FIG. 8 manages a plurality of data stored in the hard disk 7 in a way shown in FIG. 9 by using the memory 9 as the work area. Specifically, the access restriction program 17 has a document group directory 20 as a root directory, and has the function of managing a plurality of image data read with, for example, a scanning apparatus such as an optical character reader.

A group version directory 21, a DOC directory 23, an STG directory 29, a BIN directory 36 and a TMP directory 40 are formed at a lower layer of the document group directory 20. The group version directory 21 is a directory for storing the version information of created document group directory 20. In the DOC directory 23, the information concerning a plurality of image data is stored for each document. Further, in the DOC directory 23, document text data, tag data, index data and thumbnail image data are stored in addition to the image data.

A first document STG directory 32 and a second document STG directory 34 are formed at a lower layer of the STG directory 29. The first document STG directory 32 stores attached files which are managed in a one-to-one correspondence basis to the information, such as image data, to be stored in the first document STG directory 31. Further, in practice, the attachment file is stored not for each page over the one-to-one basis but for each document if the attachment file for a certain document is to be managed in the one-to-one basis. The above-described attachment file includes, for example, tables, graphs and the like relating to results of analysis of information, such as image data of the first document directory 26. Here, the attachment file is an attribute data that exists not for each page but for each document, for example. The first document directory 26 stores, for example, electronic documents that are originals of image data or attribute data for voice or moving picture images, for example.

The BIN directory 36 is for retaining indices to perform a search over the entire image data. The TMP directory 40 is for storing data temporarily. The TMP directory 40 is a temporary directory to be used inside programs for editing, for example. In other words, the TMP directory 40 has the function of storing data being edited.

The first document directory 26 and a second document directory 28 are formed at a lower layer of the DOC directory 23. In the first document directory 26 as shown in FIG. 10, an index file 41 forming a related information aggregate and an actual file 43 forming a data aggregate are stored. Preferably, a thumbnail file 45, a tag file 47, a page summary file 51 and an attached file list file 53 are also stored therein.

The access restriction program 17 manages a plurality of image data as the index file 41 and the actual file 43. Preferably, the thumbnail file 45, the tag file 47, the page summary file 51 and the attached file list file 53 are also managed.

The actual file 43 includes a plurality of image data, andt details of the actual file 43 will be described later. The index file 41 indicates the information related to the actual file 43. For example, if the actual file 43 includes a plurality of image data, the index file 41 includes the information pertaining to the resolution or the like of the image data. The details of the index file 41 will be described later.

The thumbnail file 45 stores reduced image data of the actual file 43. The tag file 47 is for handling the index of each of the image data and is thus. index information. Here, the index information means a list of data consisting of heading positions (1–4), index titles and pages. The page summary file 51 is text data indicating the summary information of the actual file 43. The page summary files 51 are text data, for example, extracted from image data by the optical character reader or the like, or, included in image data and registered by another device. The attached file list file 53 is a figure indicating lists of the attached files stored in the first document STG directory 32 of FIG. 9.

FIG. 11A is a diagram showing a data configuration of the actual file 43 of FIG. 10, and FIG. 11B is a diagram showing a data configuration of the index file 41 of FIG. 10.

The access restriction program 17 manages a plurality of data as a single integrated structure, as shown in FIG. 11A. For example, four image data from first image data 61 to fourth image data 64 are combined with tags 66 (69), 67 (69), 68 (69) inserted between the image data as delimiter information.

More specifically, the tag 66 (69) is provided between the first image data 61 and the second image data 62; the tag 67 (69) is provided between the second image data 62 and the third image data 63; the tag 68 (690 is provided between the third image data 63 and the fourth image data 64. Consequently, the first image data 61 and so forth can easily be separated by the use of the tag 66 (69) and so forth because the first image data 61 and so forth are delimited by the tag 66 (69) and so forth, respectively.

As shown in FIG. 11B, the index file 41 includes a header 55, a first body 57, a second body 58, a third body 59, and a fourth body 60. The header 55 is information for identifying each index file 41 from the other index files, which not shown in FIG. 11B. The first body 57 and so forth are data indicating information regarding the first image data 61 and so forth of the actual file 43. For example, the first body 57 includes the related information such as resolution and the like, concerning the first image data 61.

FIG. 12 shows an example of the data format of the index file 41 of FIG. 11B. The second body 58 and so forth except the first body 57 in the index file 41 shown in FIG. 11B are omitted in FIG. 12 for the simplification of description.

The index file 41 chiefly includes an "INDEX" tag, an "IDXJHEAD" tag and an "IDX_BODY" tag. "IDX_HEAD {IDX_BODY}" following the "INDEX" tag indicates that there are one or more of the "IDX_HEAD" tag and the "IDX_BODY" tag.

In FIG. 12, "DTAG_OFF" indicates the offset from the tag 66 (69) and so forth. "DTAG_COUNT" indicates the number of the tag 66 (69) and so forth shown in FIG. 11A. By referring to "DTAG_COUNT", it is possible to learn the number of the first image data 61 and so forth. These various tag informations make it possible to access desired image data with a higher speed than heretofore possible.

In FIG. 12, "DABS_OFF" indicates the offset from the head of the page summary file 51 of FIG. 10, and "DABS_LEN" indicates the number of bytes of the page summary file 51 of FIG. 10. The number of bytes in this place is assumed not to include the header in the page summary file 51 of FIG. 10.

The "IDX_BODY" tag includes a "DEG" tag. an "ACT_WIDTH" tag, an "ACT_HEIGHT" tag, an "ACT_DPI" tag, an "ACT_CMP" tag, an "ACT.OFF" tag, an "ACT_LEN" tag, a "THUMB_WIDTH" tag, a "THUMB_HEIGHT" tag, a "THUMB_CMP" tag, a "THUMB_OFF" tag, a "THUMB_LEN" tag, a "TAG_OFF" tag, a "TAG_NUM" tag, an "ANN_OFF" tag, an "ANN_NUM" tag, an "ABS_OFF" tag, an "ABS_LEN" tag, an "ABS_REGD" tag, a "RESV1" tag, a "RESV2" tag. and a "RESV3" tag.

The "DEG" tag indicates rotation angles of image data and the like. The "ACT_WIDTH" tag and the "ACT_HEIGHT" tag indicate the offsets from the head of the page summary file 51 of FIG. 10. The "ACT_DPI" tag indicates the resolutions of image data of actual images and the "ACT_CMP" tag indicates an example of the compression method of image data. The "ACT_OFF" tag indicates the offset from the head of the actual file 43. The "ACT_LEN" tag indicates the numbers of bytes of image data.

The "THUMB_WIDTH" tag and the "THUMB_HEIGHT" tag indicate the dot size of the thumbnail file 45. The "THUMB_CMP" tag indicates the compression rate of the thumbnail file 45. The "THUMB_OFF" tag indicates the offset from the head of the thumbnail file 45. The "THUMB_LEN" tag indicates the number of the bytes of the thumbnail file 45.

The "TAG_OFF" tag indicates the offsets from the head of the tag 66 and so forth shown in FIG. 11A. The "TAG_NUM" tag indicates the numbers of the tag 66 and so forth.

The "ANN_NUM" tag indicates the number of annotations. The "ABS_OFF" tag indicates the offset from the head of the page summary file 51. The "ABS_LEN" tag indicates the number of bytes of the page summary file 51. The "ABS_REGD" tag indicates whether the summary file 51 has been registered or not. These tags may be used by an OCR or the like.

The data management system 1a has the configuration described above. With reference to FIGS. 7–12, an operation example of the data management system 1a is described. In the following description, as an example of the operation of the data management system 1a, an operation of data communication from the server computer SV as a transmission terminal shown in FIG. 7 to a client computer CL as a receiving terminal is exemplified.

<Creation Processing of Image Data>

The data to be objects are read with an optical character reader or the like provided in the client computer CL, and the information such as an rotation angle, a resolution, a compression method and the like of an image is newly generated to be recorded in the index file 41 shown in FIG. 11B. In addition, the thumbnail file 45 is generated. Such data may be created in other words, reading images with a scanner, by reading images with a printing processing of a virtual printer driver, or by reading images via data exchange of image data with another program.

<Generation Processing of Actual File by Combining Image Data Mutually>

Then, the read image is made to be the actual file 43, as it will be described later. The sizes of the actual file 43 and the thumbnail file 45, both shown in FIG. 10, are registered in "ACT_LEN" and "THUMB_LEN" of the index file 41 shown in FIG. 12, respectively. In a full-text keyword retrieval index retention directory 38 as shown in FIG. 9, keywords for the full-text keyword retrieval with respect to the actual file 43 are stored. These keywords are data in text format and the index in this section indicates an index file that is separately managed for the full-text retrieval.

For the mutual combination of the image data, the information of the tag 66 and so forth in the actual file 43 shown in FIG. 11A is changed. More specifically, the data of "DTAG_COUNT" in the index file 41 shown in FIG. 12 is increased by the data of "DTAG_COUNT" of the image data to be inserted. On the other hand, in the actual file 43, as shown in FIG. 1A, both of the tag 68 (69) to be inserted and the fourth image data 64 are made to be a set, and are combined after the third image data 63.

The server computer SV has the function of managing a plurality of data as described above. The server computer SV manages, for example, the data of four sheets of images as the actual file 43 in which the image data are combined with the tag 66 (69) and so forth as the delimiter information for each of the image data from the first image data 61 to the fourth image data 64 shown in FIG. 11A. Because the first image data 61 to the fourth image data 64 can be managed integrally by managing the first image data 61 and so forth in such a combined state, the burden of the management for the prevention of the separation of these image data can be eliminated.

As another combination method in place of the above-mentioned combination method, in the case where the first image data 61 includes a first unit of image data and a second unit of image data, the second image data 62 may be combined with the first unit of image data, and the second unit of image data may be combined after that to form the combination of the first unit of image data+the second image data 62+the second unit of image data.

The server computer SV manages the index file 41 as the information regarding the actual file 43 in addition to the actual file 43 itself. The index file 41 includes the first body 57 to the fourth body 60 corresponding to the first image data 61 to the fourth image data 64, respectively, and the header 55. That is, the first body 57 to the fourth body 60 indicate the information concerning the resolution and the like corresponding to the first image data 61 to the fourth image data 64, respectively. By such a configuration, the first body 57 to the fourth body 60 can also be managed integrally.

<Addition Processing>

FIG. 13 to FIG. 15 are diagrams showing an example of the processing of adding image data and in each diagram, dotted lines indicate a mutual link.

FIG. 16A is a diagram showing a configuration of the index file 41 before addition processing, and FIG. 16B is a diagram showing the index file 41 after the addition processing.

The actual file 43 before adding image data includes image data A1, the tag 69, image data A2, the tag 69, image data A3 and an end-of-file word EOF, for example, as shown in FIG. 13A. The index file 41 before adding image data stores the information concerning an order for example "1", "2" and "3") as the first body 57 to the third body 59 as shown in FIG. 13.B.

In the following description, the addition of image data B1 shown in FIG. 14 between the image data A2 and the image data A3 of the actual file 43 shown in FIG. 13A is explained.

First, the image data B1 of FIG. 14 is added to the actual file 43 with the tag 69 put between them as shown in FIG. 15A, and the end-of-file word EOF is attached at the end. That is, in the actual file 43, the image data B1 is not added by separating the image data A3 from the image data A2. Consequently, because only the image data B1 is added in the actual file 43, the addition of the image data B1 can be processed at a high speed.

In the index file 41, the length thereof is elongated by the length of the added image data B1. The position of a page or the like to which the image data B1 is inserted is set to a fourth body 60 as "3", as shown in FIG. 15B. In addition to the setting, the third body 59 is set as "4" indicating the position of the image data A3.

If the modification of the index file 41 is shown concretely, the setting shown in FIG. 16A is modified to the setting shown in FIG. 16B. Following the procedure described above, the addition processing or insertion processing is completed.

<Deletion Processing>

Figure 17A:
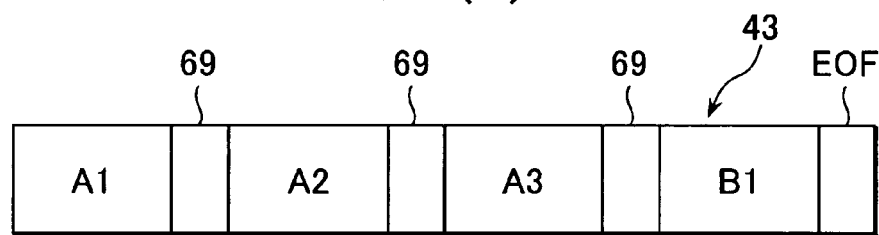
FIGS. 17A and 17B are diagrams showing the processing of deleting image data.
Figure 17B:
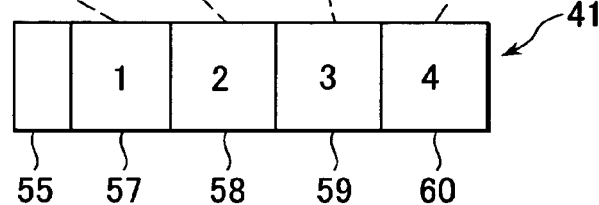
Figure 18A:
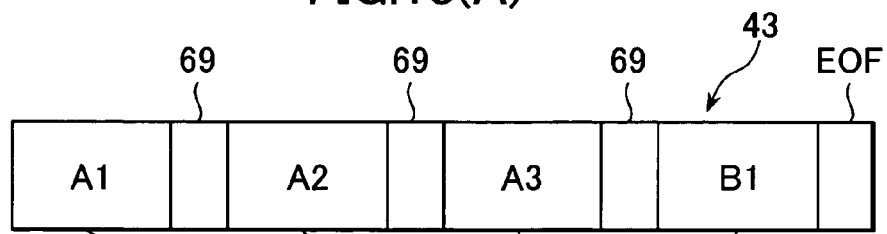
FIGS. 18A and 18B are diagrams showing the processing of deleting image data.
Figure 18B:
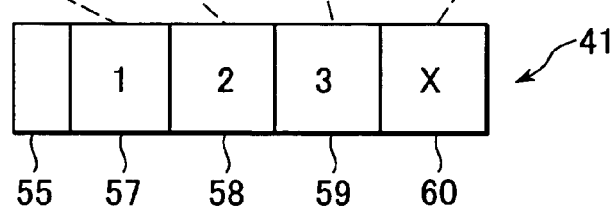

FIG. 17 and FIG. 18 are diagrams showing the deletion processing of image data in which in each figure, dotted lines indicate a mutual link.

FIG. 19A is a diagram showing a configuration of the index file 41 before the deletion processing, and FIG. 19B is a diagrams showing a configuration of the index file 41 after the deletion processing.

The actual file 43 before deleting image data includes the image data A1, the tag 69, the image data A2, the tag 69, the image data A3, the tag 69, the image data B1 and the end-of-file EOF, as shown in FIG. 17A. The index file 41 before deleting the image data stores the information concerning an order for example, "1", "2", "3" and "4" as the first body 57 to the fourth body 60, as shown in FIG. 17B.

In the following description, the deletion of the image data B1 from the actual file 43 shown in FIG. 17A is explained The deletion of the image data B1 is not actually performed in the actual file 43, however, in the index file 41, a mark "x" indicating to be voided is set to the fourth body 60 corresponding to the image data B1 to be deleted.

If the modification of the index file 41 is specified in a more concrete way, the setting shown in FIG. 19A becomes the setting shown in FIG. 19B, thus, the deletion processing is completed.

<Division Processing>

FIG. 20A–FIG. 22B are diagrams showing an example of the division processing of the image data. In each figure, the dotted lines indicate a mutual link.

Figure 23A:
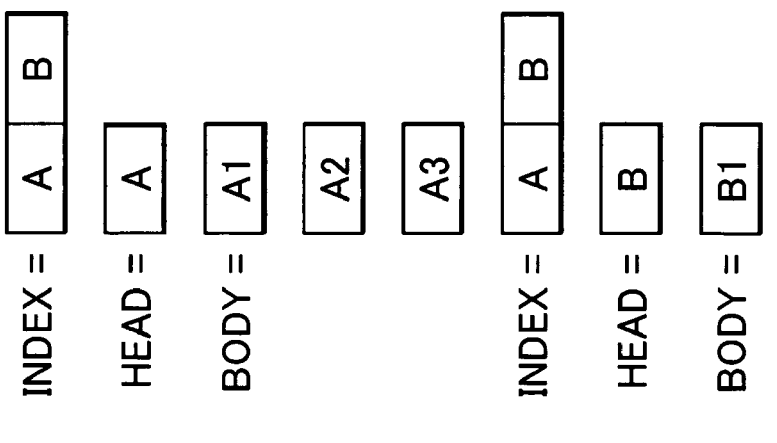
FIG. 23A is, a diagram showing a configuration of the index file before the division processing.
Figure 23B:
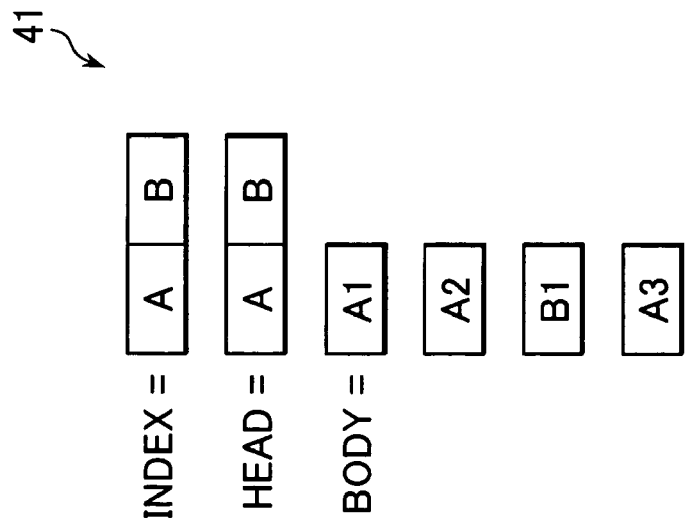
FIG. 23B is a diagram showing a configuration of the index file after the division processing.

FIGS. 23A and 23B are diagrams showing configuration of the index file 41.

In FIG. 20A, the actual file 43 before dividing the image data includes the image data A1, the tag 69, the image data A2, the tag 69, the image data A3, the tag 69, the image data B1 and the end-of-file word EOF, as shown in FIG. 20A. The index file 41 before dividing the image data stores the information concerning an order, for example "1", "2", "3" and "4", as the first body 57 to the fourth body 60, as shown in FIG. 20B.

In the following description, the division of the image data B1 from the actual file 43 shown in FIG. 20A is explained.

The division of the image data B1 is not actually performed in the actual file 43, however, in the index file 41, a mark "x" indicating to be voided is set to the fourth body 60 corresponding to the image data B1 to be divided.

The image data B1 of the actual file 43 is copied as shown in FIG. 22A, and made to be an actual file 43 having the end-of-file word EOF at the end thereof. An index file 41 relating to the actual file 43 shown in FIG. 22A is generated, as shown in FIG. 22B.

If the modification of the index file 41 is explained more specifically, the setting as shown in FIG. 23A becomes the setting shown in FIG. 23B. In the manner described above, the division processing is completed.

<Data Communication Processing>

The actual file 43 and the index file 41, both being managed by the server computer SV, are transmitted to the client computers CL by data communication in accordance with, a File Transfer Protocol (FTP) through the network 11 of FIG. 7. The data management system 1a performs the data communication of the image data from the first image data 61 to the fourth image data 64, as unified data. By the employment of such a method, the data management system 1a can perform the data communication as unified data accurately without partially communicating and without any data going missing.

In the data management system 1a, the image data from the first image data 61 to the fourth image data 64 may be transmitted by, data communication respectively. By the employment of such a process, the data management system 1a can communicate each of the data at a higher speed than communicating integrally. When each of the image data from the first image data 61 to the fourth image data 64 is cut out, they are separated by the use of the tag 66 as references.

According to the second embodiment of the present invention, the image data from the first image data 61 to the fourth image data 64 as the plurality of data can be handled easily as unified data. That is, in the data management system 1a, the actual file 43 is made by combining a plurality of image data having different image formats, and it is managed as one file. Consequently, in the case where a plurality of image data is processed as a batch, it prevents leaving off processing some part of the image data. Moreover, according to the second embodiment of the present invention, because the number of times of accessing each file storing image data or the like decreases, file inputs and outputs in reading and writing can be decreased. Moreover, according to the second embodiment of the present invention, the number of files of image data to be managed can be decreased. Thus, if the number of files to be managed is, only one, the program processing can be performed as a batch.

When use each of a plurality of images to resemble a page and turning them over at a high speed, as shown in FIG. 11A, each image can be accessed at a high speed and further corresponding data can be transmitted for each page, because each of the image data from the first image data 61 to the fourth image data 64 is only divided with the tag 66 and so forth within the same data. If the pages of the images are turned over at a high speed, the images having a plurality of image formats can be displayed without any delay that migh cause a sense of discomfort to the user.

In the data management system 1a, the first image data 61 to the fourth image data 64 can be managed by being combined with the tag 66 and so forth to be unified data. Consequently, if each of the image data from the first image data 61 to the fourth image data 64 is a literary work, the alteration thereof can be prevented to keep the continuity thereof. Further, it is possible to realize a system that may easily be used by a user for creating various forms of files from a single document as described above and utilizing them in accordance with their specific objectives. For example, an overview of image data may be viewed by using the thumbnail files, or a high speed search can be performed by utilizing the text data.

The present invention is not limited to the above-mentioned embodiments.

In the first embodiment, encrypted link information 39a regarding only the specified pages and the attribution of the link information 39 shown in FIG. 5 is distributed. It is not limited thereto, however, and any other document group names or document names may be encrypted and distributed.

Further, the link information 39a may be used in a similar way as a short-cut file that allows automatic access to the management server 25 when the link information 39a is clicked and for viewing of the pages specified in the document 19B if it is authorized. If the file is created as a short-cut file and such a short cut is directly triggered, actual processing such as decryption, checking of the authorization status and the like may be performed by associated applications.

Further, the above described link information 39a may be encrypted by employing various encryption codes.

A program storage medium to be used for installing an access restriction program executing the above-mentioned series of processing steps into a computer to make it possible to execute the program by the computer, may be not only a package medium such as a flexible disk, for example, a floppy (a registered trade mark), a compact disc read only memory (CD-ROM), a digital versatile disc (DVD) and the like, but also a semiconductor memory, a magnetic disk and the like, in which a program is stored temporarily or permanently.

As a means for storing a program in such program storage media, a wired or a radio communication medium such as a local area network, the Internet, digital satellite broadcasting and the like may be used, and the program may be stored in such media by interposing various communication interfaces such as a router, a modem and the like.

The above-described management server 25, clients 23A–23D may be respectively provided with a drive apparatus capable of reading out data, such as programs and the like, of the program storage media described above.

Further, the access restriction program having an access restriction function for performing the above-described functions may not be limited to a form which is stored in the above described program storage media and may be in a form that is data-communicated via various communication means, such as the internet.

The server computer SV and the client computer CL may be equipped with a drive apparatus capable of reading the data such as a program in the program storage media at least.

Although, the second embodiment of the present invention is described in relation to the case where the invention is applied only to the server computer SV managing a plurality of data mainly in the embodiment thereof, it is not limited to the sever computer SV. The invention may be applied to the whole of the data management system 1a so as to have a configuration to manage a plurality of data as a whole.

A part of each configuration of the embodiment may be omitted, or each of the configurations may be combined with each other in a different way from that described above, arbitrarily.

As described above, with the access restriction apparatus, the access restriction method, the computer readable program storage medium having a recorded access restriction program, and the access restriction program, it is possible to restrict access to data and prevent information alteration.

What is claimed is:

1. An access restriction apparatus for restricting a terminal accessing managed management information, said access restriction apparatus comprising:
   supply means for supplying said terminal with link position information indicating a linking destination of said management information, said link position information being at least partially encrypted; and access management means for managing access of said terminal to said management information based on said link position information decoded by said terminal, and wherein said management information includes a plurality of pages and said link position information is operable to control access to one or more of the plurality of pages based on an access authority set in said terminal and an attribute indicating whether to permit access.

2. The access restriction apparatus according to claim 1, wherein:

said access management means is configured to judge whether said terminal has authority to access said management information based on an access authority set in terminal.

3. The access restriction apparatus according to claim 2, wherein:

said apparatus is configured to make said management information include a plurality of pieces of unit information, and to make said link position information include specification information specifying whether said terminal can access each piece of said unit information.

4. The access restriction apparatus according to claim 1, wherein:

said management information is configured to utilize:

a collection of data that is formed by combining said plurality of data with delimiter information arranged in between said plurality of data constituting said management information; and a collection of related information that is formed by combining a plurality of information relating to said plurality of data respectively.

5. The access restriction apparatus according to claim 4, wherein:

when other data is to be added to said collection of data, said other data is added to an end of said plurality of data, and an order of said plurality of data and said other data are managed with said collection of related information aggregate.

6. The access restriction apparatus according to claim 4, wherein:

when part of said plurality of data is to be deleted, deletion processing is performed to related information in said collection of related information instead of deleting said part of said collection of data, said collection of related information corresponding to a part of said plurality of data to be deleted from said collection of data.

7. An access restriction method for restricting a terminal accessing managed management information having one or more pages, said method comprising:

supplying said terminal with link position information indicating a linking destination of said management information, said link position information being at least partially encrypted; and managing access of said terminal to a page of said management information based on said link position information decoded by said terminal, an access privilege associated with the terminal and an attribute indicating whether access privilege to the terminal is permitted.

8. The access restriction method according to claim 7, further comprising:

generating a collection of data by combining and integrating a plurality of data constituting said management information with delimiter information arranged in between said plurality of data; and generating a collection of related information by combining and integrating a plurality of information related to said plurality of data included in said collection of data, respectively.

9. A computer readable program storage medium having a recorded access restriction program for performing a function of restricting a terminal for accessing managed management information comprising a plurality of pages, said computer readable program storage medium having said recorded access restriction program that executes:

supplying said terminal with link position information indicating a linking destination of said management information, said link position information being at least partially encrypted; and managing access of said terminal to at least one page of said management information based on said link position information decoded by said terminal, an access privilege associated with the terminal and an attribute indicating whether access privilege to the terminal is permitted.

10. The computer readable program storage medium according to claim 9, characterized wherein said recorded access restriction program that executes:

generating a collection of data by combining and integrating a plurality of data constituting said management information with delimiter information arranged in between said plurality of data; and generating a collection of related information by combining and integrating a plurality of information related to said plurality of data included in said collection of data, respectively.

* * * * *

UNITED STATES PATENT AND TRADEMARK OFFICE
CERTIFICATE OF CORRECTION

| | | |
|---|---|---|
| PATENT NO. | : 7,127,580 B2 | Page 1 of 1 |
| APPLICATION NO. | : 10/416644 | |
| DATED | : October 24, 2006 | |
| INVENTOR(S) | : Masayuki Takeuchi et al. | |

It is certified that error appears in the above-identified patent and that said Letters Patent is hereby corrected as shown below:

Column 11, line 1, "FIG. 1A" should read -- FIG. 11A --.

Signed and Sealed this

Twenty-third Day of October, 2007

JON W. DUDAS
*Director of the United States Patent and Trademark Office*